US006369924B1

(12) United States Patent
Scharf et al.

(10) Patent No.: US 6,369,924 B1
(45) Date of Patent: Apr. 9, 2002

(54) OPTICAL TRANSCEIVER WITH ENHANCED SHIELDING AND RELATED METHODS

(75) Inventors: Robert M. Scharf; Randal B. Lord, both of Melbourne, FL (US)

(73) Assignee: Stratos Lightwave, Inc., Chicago, IL (US)

( * ) Notice: Subject to any disclaimer, the term of this patent is extended or adjusted under 35 U.S.C. 154(b) by 0 days.

(21) Appl. No.: 09/063,190

(22) Filed: Apr. 20, 1998

(51) Int. Cl.[7] .............................................. H04B 10/00
(52) U.S. Cl. ........................................ 359/152; 359/163
(58) Field of Search ................................. 359/152, 163; 385/88, 92, 94

(56) References Cited

U.S. PATENT DOCUMENTS

| | | | |
|---|---|---|---|
| 4,727,248 A | | 2/1988 | Meur et al. ............... 250/239 |
| 4,744,626 A | | 5/1988 | Mery ....................... 350/96.2 |
| 4,767,179 A | | 8/1988 | Sampson et al. .......... 350/96.2 |
| 5,011,246 A | | 4/1991 | Corradetti et al. ......... 350/96.2 |
| 5,047,835 A | * | 9/1991 | Chang ........................ 357/74 |
| 5,109,454 A | | 4/1992 | Okuno et al. ................ 385/92 |
| 5,117,476 A | * | 5/1992 | Yingst et al. ................ 385/88 |
| 5,227,646 A | | 7/1993 | Shigeno ....................... 257/80 |
| 5,337,396 A | * | 8/1994 | Chen et al. .................. 385/92 |
| 5,361,318 A | | 11/1994 | Go et al. ..................... 385/89 |
| 5,528,408 A | * | 6/1996 | McGinley et al. .......... 359/152 |
| 5,535,034 A | * | 7/1996 | Taniguchi .................. 359/152 |
| 5,564,083 A | | 10/1996 | Lee et al. .................... 455/90 |
| 5,594,579 A | * | 1/1997 | Branan, Jr. ................. 359/145 |
| 5,604,831 A | * | 2/1997 | Dittman et al. .............. 385/88 |
| 5,901,263 A | * | 5/1999 | Gaio et al. ................... 385/92 |
| 6,072,613 A | * | 6/2000 | Henningsson et al. ...... 359/152 |

FOREIGN PATENT DOCUMENTS

| | | | | |
|---|---|---|---|---|
| EP | 0448989 A1 | 10/1991 | ............ | G02B/6/42 |
| EP | 0652696 A1 | 11/1994 | ............ | H05K/9/00 |

OTHER PUBLICATIONS

Patent Abstracts of Japan vol. 097, No. 010, Oct. 31, 1997 & JP 09 171127 A (Matsushita Electric Ind Co Ltd) Jun. 30, 1997.
Patent Abstracts of Japan vol. 013, No. 338 (E–795), Jul. 28, 1989 & JP 01 098299 A (Fujitsu Ltd), Apr. 17, 1989.
Patent Abstracts of Japan vol. 096 No. 011, Nov. 29, 1996 & JP 08 194129 A (Hoya Corp), Jul. 30, 1996.
Patent Abstracts of Japan vol. 097, No. 011, Jan. 31, 1997 & JP 08 248277 A (Fujitsu Ltd), Sep. 27, 1996.

* cited by examiner

Primary Examiner—Leslie Pascal
Assistant Examiner—Dalzid Singh
(74) Attorney, Agent, or Firm—Steven M. Evans

(57) ABSTRACT

An optical transceiver module includes a transmitter portion and receiver portion positioned within a housing with an EMI shield therebetween, and wherein the transmitter and receiver portions include respective substrates, or circuit boards, with opposing and spaced apart major surfaces. The port density, when using a plurality of such modules, is increased, while providing enhanced EMI shielding. Each circuit board may include a ground plane and have a plurality of generally L-shaped conductive leads extending outwardly from the respective circuit boards. The optical transmitter and optical receiver portions each preferably further comprise at least one active component mounted on the first major surfaces. Accordingly, these active components face one another. The optical transmitter portion preferably further includes an optical emitter connected to an end of the first circuit board, and the optical receiver portion preferably further comprises an optical detector carried by an end of the second circuit board. In addition, the housing preferably includes an integrally formed transverse bulkhead with respective openings receiving the optical emitter and the optical detector. The transverse bulkhead also defines a forward cavity for receiving an optical fiber connector. The housing may have a generally rectangular elongate shape and have a series of longitudinally extending slots therein. The EMI shield, and first and second substrates or circuit boards may be received in these lots for convenience of assembly.

43 Claims, 5 Drawing Sheets

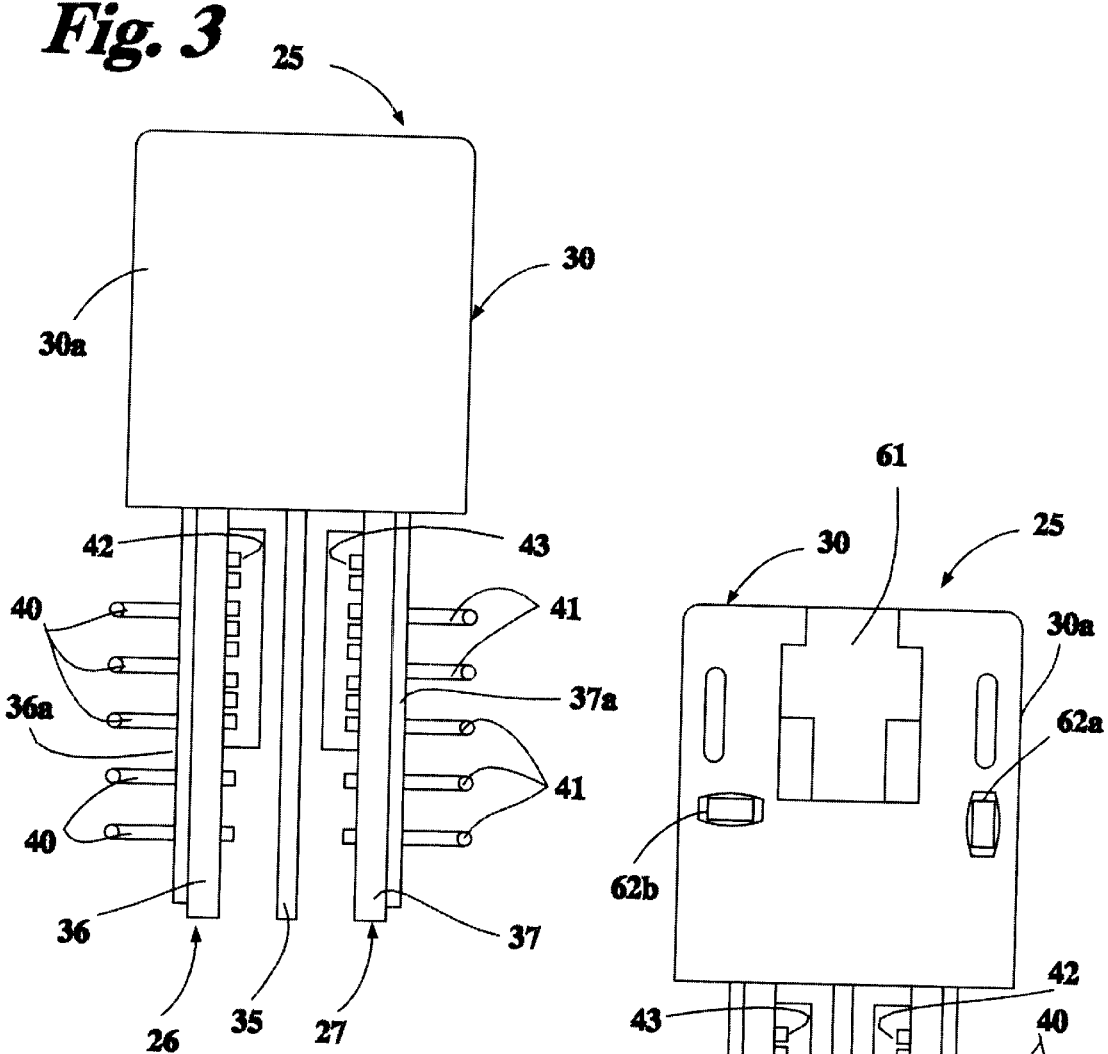
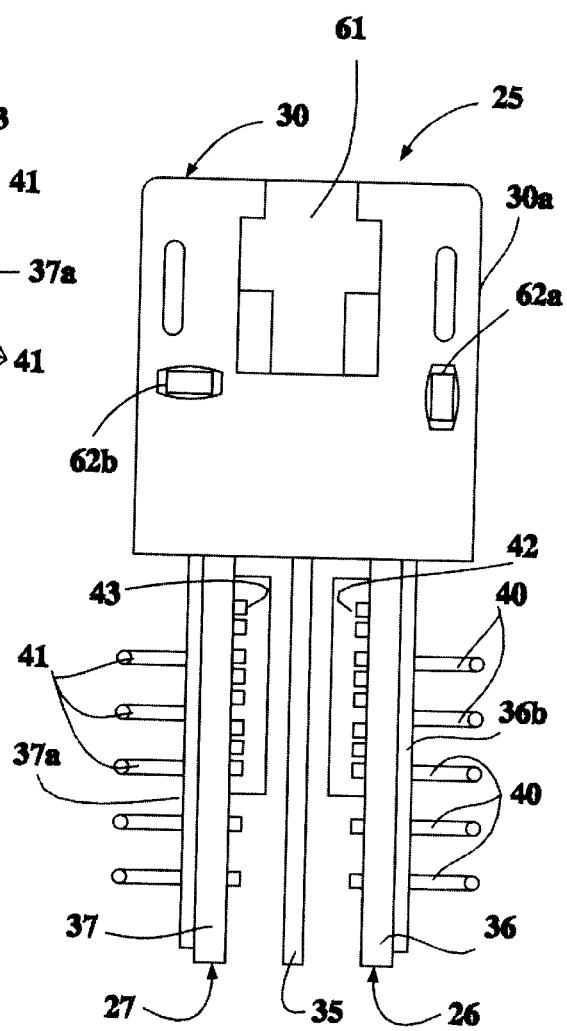
Fig. 3
Fig. 4

Fig. 5
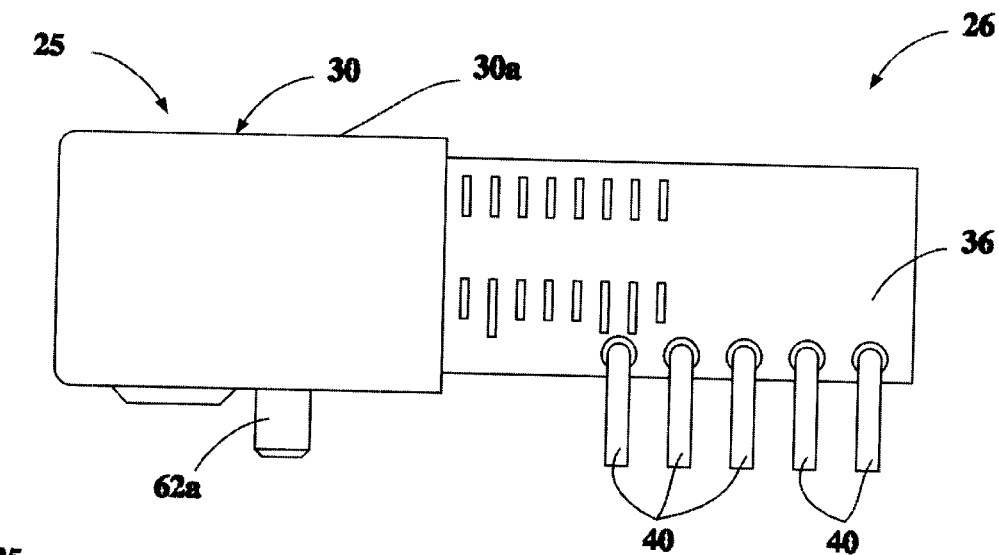
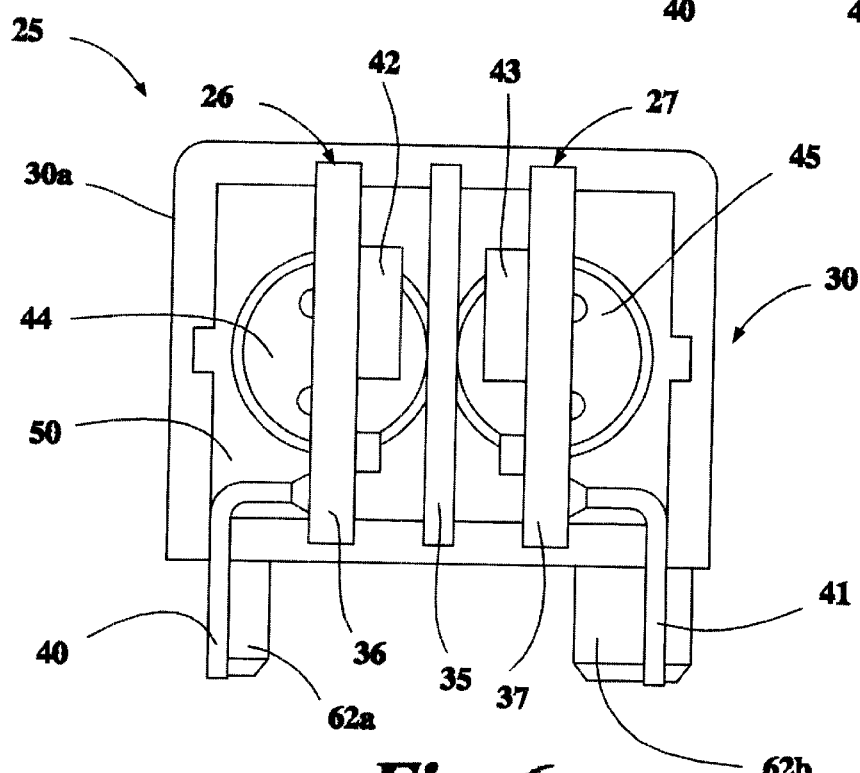
Fig. 6

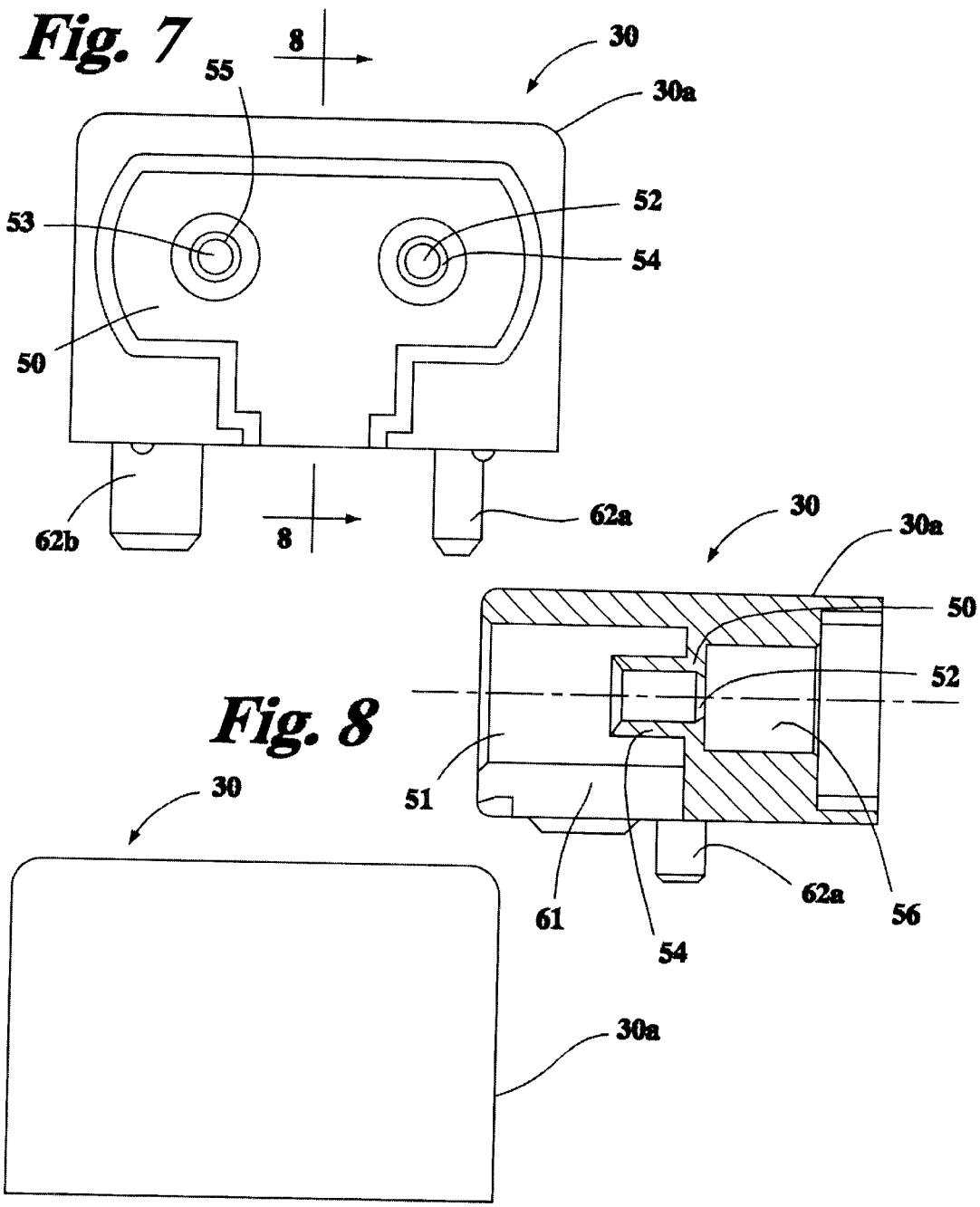

OPTICAL TRANSCEIVER WITH ENHANCED SHIELDING AND RELATED METHODS

FIELD OF THE INVENTION

The invention is directed to the field of electronic devices and components, and, more particularly, to a transceiver module including an optical transmitter and an optical receiver.

BACKGROUND OF THE INVENTION

Optical transmitters and receivers are widely used in communications applications, such as for Local Area Networks (LAN), for example. An optical transmitter typically produces either analog or digital optical signals based upon input electrical signals. Similarly, an optical receiver receives optical signals and produces output electrical signals. The optical signals are often carried by a fiber optic cable which guides the optical signals at a relatively low loss. Moreover, optical signals carried over fiber cables are relatively immune to electrical noise sources as may affect other types of communications via copper wires, for example. Another advantage of optical fiber communication is that information signals having relatively high bandwidths can be carried.

For many applications, such as for a LAN, two-way communications are desirable. Accordingly, an optical transmitter and receiver may be paired within a housing and thereby defining a so-called optical transceiver module. Moreover, since a relatively large number of such two-way links may need to be established, an optical transceiver module may desirably be relatively small so that a high "port density" can be achieved in an apparatus employing a large number of transceiver modules. In other words, a large number of optical transceivers may be collocated within a common housing and connected to common circuitry, such as at a distribution point for an optical LAN.

U.S. Pat. No. 5,604,831 to Dittman et al. discloses an optical transceiver module including a pair of side-by-side circuit board portions, for respective transmitter and receiver devices, and enclosed within an overall housing. Connector pins extend outwardly from the plane of the circuit boards. Along these lines, U.S. Pat. No. 5,047,835 to Corradetti et al. discloses an optical transceiver module including a pair of side-by-side connectors, and their horizontally positioned associated circuit boards within an overall housing. The housing includes a transversely extending wall for mounting the optical devices. U.S. Pat. No. 5,109,454 to Okuno et al. discloses another optical transceiver module with side-by-side circuit boards mounted horizontally and separated by a plastic housing portion.

Unfortunately, as the speed or operating frequencies of the transmitter and receiver are increased, electromagnetic interference (EMI) may be coupled between these circuit portions. The EMI or noise difficulties may become more severe as the sizes of the circuit boards and components are reduced in an effort to increase port density. U.S. Pat. No. 5,047,835 to Chang discloses an overall EMI shield and heat sink which covers the circuit board which, in turn, mounts both the transmitter and receiver circuitry. U.S. Pat. No. 5,117,476 to Yingst et al. discloses an optical transceiver including a common horizontally extending circuit board with individual shields over the transmitter and receiver circuit portions.

Unfortunately, conventional optical transceiver modules are relatively large, especially in terms of their widths, and therefore, the port density may be too low for many useful commercial applications. Moreover, EMI may still be a problem for an optical transceiver, especially as sizes are reduced and higher operating frequencies are used.

SUMMARY OF THE INVENTION

In view of the foregoing background, it is therefore an object of the present invention to provide an optical transceiver module which is relatively compact to thereby provide increased port density when combined with other modules.

It is another object of the present invention to provide an optical transceiver module and associated method having enhanced resistance to internally generated EMI.

These and other objects, features and advantages in accordance with the present invention are provided by an optical transceiver module comprising a transmitter portion and receiver portion positioned within a housing with an EMI shield therebetween, and wherein the transmitter and receiver portions comprise respective substrates with opposing spaced apart major surfaces. Considered in somewhat different terms, the substrates are turned on their sides into a vertical orientation with the vertical shield positioned between the substrates within the housing. Accordingly, the port density when using a plurality of such modules is increased, while providing enhanced EMI shielding.

The first and second substrates preferably comprise respective first and second circuit boards. In addition, each substrate may preferably further include a ground plane. The ground planes may be provided by respective conductive layers carried on the second major surfaces or outside surfaces of the substrates. The ground planes and the EMI shield serve to sandwich the active components.

Each circuit board may carry a plurality of generally L-shaped conductive leads extending outwardly for connection to a mounting circuit board, for example. The optical transmitter and optical receiver portions each preferably further comprise at least one active component mounted on the first major surfaces. Accordingly, these active components face one another as positioned in the housing.

According to another advantageous aspect of the present invention, the optical transmitter portion preferably further comprises an optical emitter carried by an end of the first circuit board. The optical receiver portion preferably further comprises an optical detector carried by an end of the second circuit board. In addition, the housing preferably includes an integrally formed transverse bulkhead with respective openings receiving the optical emitter and the optical detector. The transverse bulkhead also defines a forward cavity for receiving an optical fiber connector.

The housing may have a generally rectangular elongate shape and have a series of longitudinally extending slots therein. The EMI shield, and the first and second substrates or circuit boards may be received in respective pairs of slots for convenience of assembly. The EMI shield and the housing preferably comprise an electrically conductive material. The housing may comprise a forward portion and a rearward portion also to facilitate assembly. The housing also preferably further comprises a plurality of keyed mounting projections extending outwardly from a predetermined surface to facilitate mounting. Of course, a plurality of such transceiver modules may be assembled in side-by-side relation on the mounting circuit board to thereby provide a high port density for the apparatus.

A method aspect of the invention is for making an optical transceiver module of a type comprising a housing, an optical transmitter portion comprising a first substrate having a first major surface, and an optical receiver portion comprising a second substrate having a first major surface. The method preferably comprises the steps of positioning the first and second substrates within the housing so that the respective first and second major surfaces are opposing and in spaced apart relation from one another, and positioning an EMI shield within the housing and extending between the first and second major surfaces of the first and second substrates.

Another method aspect of the invention is also for making an optical transceiver module and preferably comprises the steps of forming a housing to have a generally rectangular elongate outer portion, and an integrally formed transverse bulkhead having first and second openings therein and defining a forward cavity for receiving an optical fiber connector therein; and, positioning an optical transmitter portion within the housing comprising a first substrate and an optical emitter carried by an end of the first substrate in registration with the first opening in the bulkhead. The method also preferably further includes the step of positioning an optical receiver portion within the housing comprising a second substrate and an optical detector carried by an end of the second substrate aligned in registration with the second opening of the bulkhead. An EMI shield is preferably positioned within the housing and extends between the first and second substrates.

BRIEF DESCRIPTION OF THE DRAWINGS

FIG. 3 is a top plan view of an optical transceiver module as shown in FIG. 1 with the rearward housing portion removed and with the ground planes on the substrates shown with an exaggerated thickness for clarity.

FIG. 4 is a bottom plan view of an optical transceiver module as shown in FIG. 1 with the rearward housing portion removed and with the ground planes on the substrates shown with an exaggerated thickness for clarity.

FIG. 5 is a side elevational view of an optical transceiver module as shown in FIG. 1 with the rearward housing portion removed.

FIG. 6 is a rear elevational view of an optical transceiver module as shown in FIG. 1 with the rearward housing portion removed.

FIG. 7 is a front elevational view of an optical transceiver module as shown in FIG. 1 with the rearward housing portion removed.

FIG. 8 is a cross-sectional view taken along line 8—8 of FIG. 7.

FIG. 9 is a top plan view of the forward housing portion of the optical transceiver module as shown in FIG. 1 illustrated without the rearward housing portion, and without the transmitter and receiver circuit boards.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
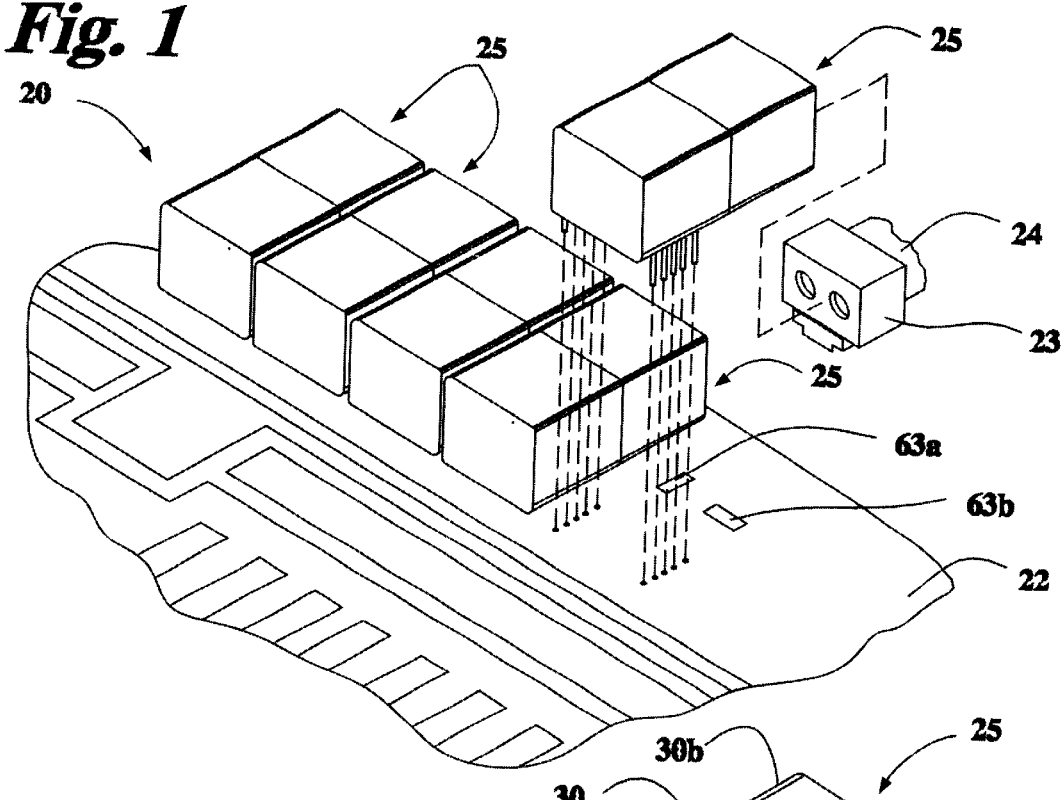
FIG. 1 is a perspective view of a portion of an apparatus including a plurality of optical transceiver modules in accordance with the present invention.

Referring first to FIG. 1, an electronic communication apparatus 20 including a plurality of optical transceiver modules 25 in accordance with the present invention is explained. The modules 25 are illustratively mounted on a mother board or mounting circuit board 22 as will be readily appreciated by those skilled in the art. As will also be appreciated by those skilled in the art, an overall housing, not shown, may protect the mounting circuit board 22 for the apparatus 20b. The transceiver module 25 in accordance with the present invention may be made relatively small in size to thereby achieve a high port density when combined with the other optical transceiver modules in the apparatus 20. Such an apparatus 20 may be used for an optical fiber LAN, for example. Of course, a plurality of optical transceivers 25 may also be used in other applications.

Moreover, an optical transceiver module 25 may be used by itself, such as for an optical-to-electrical signal interfacing at a computer, for example.

A mating optical fiber connector 23, including an attached fiber optic cable 24, may be connected to each transceiver module 25 as will also be readily appreciated by those skilled in the art. The optical fiber cable 24 may include two fibers, not shown,—a first fiber for the transmit direction, and a second fiber for the receive direction.

Turning now additionally to FIGS. 2–11, the optical transceiver module 25 in accordance with the present invention is further described. The optical transceiver module 25 illustratively includes a transmitter portion 26 and receiver portion 27 positioned within a generally rectangular elongate housing 30 with an EMI shield 35 between the two portions. The housing 30 illustratively includes a forward portion 30a and a rearward portion 30b. The transmitter and receiver portions 26, 27 illustratively include respective substrates or circuit boards 36, 37 mounted to have their first major surfaces in opposing spaced apart relation. The circuit boards 36, 37 are turned on their sides within the housing 30 in a vertical orientation. Thus, the width of the modules 25 may be made relatively small, for example, only about 0.6 inches, so that the port density can be relatively high. The EMI shielding is also enhanced in the illustrated mounting arrangement.

The transmitter circuit portion 26 illustratively includes a plurality of generally L-shaped conductive pins or leads 40 extending outwardly from the transmitter circuit board 36. Similarly, the optical receiver portion 27 has a plurality of generally L-shaped conductive leads 41 extending outwardly from the receiver circuit board 37 as shown in the illustrated embodiment. The arrangement of the conductive leads 40, 41 also facilitates the compact shape and ready interconnection for the optical transceiver module 25.

As also shown in the illustrated embodiment, the optical transmitter and optical receiver portions 26, 27 each preferably further comprise at least one respective active component 42, 43 mounted on the first major surfaces which face one another. In the illustrated embodiment, the active components 42, 43 are integrated circuits, although those skilled in the art will appreciate that other active components, such as discrete transistors, resistors, etc. are also contemplated by the present invention. As the circuit boards 36, 37 are positioned, these active components 40, 41 face one another so that signals radiated from the surface of the boards are between conductive portions of the boards and the EMI shield 35.

As shown perhaps best in FIGS. 3 and 4, each circuit board or substrate 36, 37 also preferably carries a conductive ground plane 36*a*, 37*a*. In the illustrated embodiment, the ground planes 36*a*, 37*a* are carried by the second major surfaces of the boards and are shown in an exaggerated thickness for clarity of explanation. The ground planes 36*a*, 37*a* may be provided by a relatively thin conductive layers on the respective circuit boards 36, 37 as will be readily appreciated by those skilled in the art. The ground planes 36*a*, 37*a* together with the EMI shield 35 sandwich the active components and greatly reduce or prevent EMI difficulties, especially at higher port densities and higher operating frequencies and power. In other words, the sandwich arrangement both protects the active components from radiated noise, as well as prevents radiation of noise from the active components beyond the shield and ground planes.

The optical transmitter portion 26 also preferably further includes an optical emitter 44 (FIG. 6) connected to or carried by an end of the first circuit board 36. The optical emitter 44 may be an LED or laser as will be readily appreciated by those skilled in the art. Along these same lines, the optical receiver portion 27 may further include an optical detector 45 (FIG. 6) carried by an end of the second circuit board 27.

Figure 2:
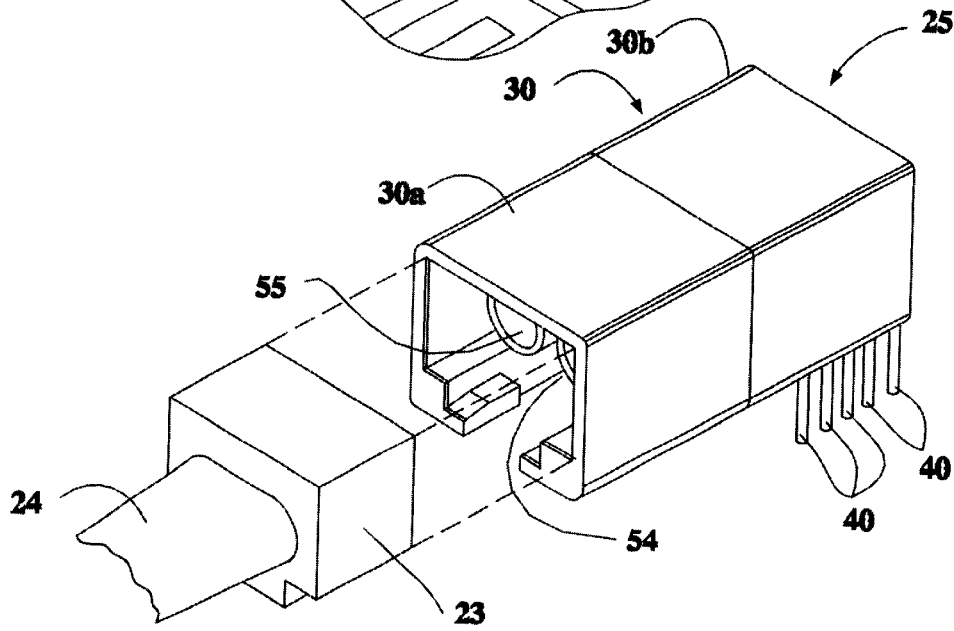
FIG. 2 is a front perspective view of an optical transceiver module and associated optical fiber cable and connector as shown in FIG. 1.
Figure 10:
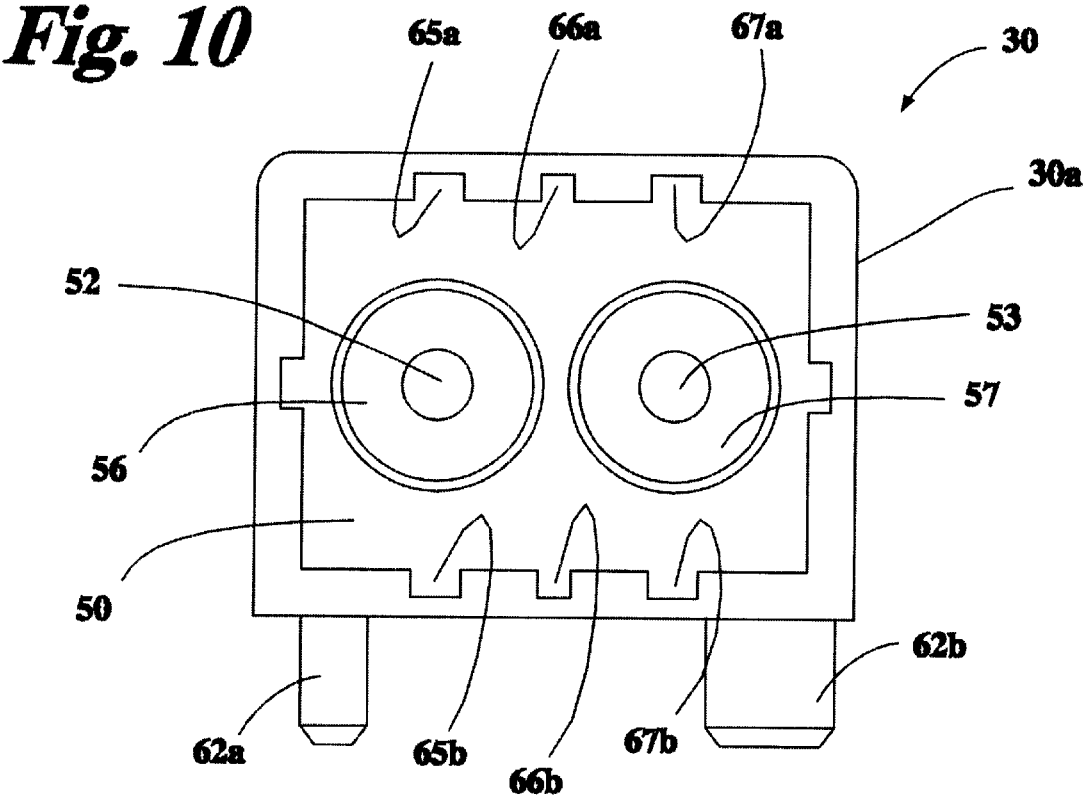
FIG. 10 is a rear elevational view of the forward housing portion of the optical transceiver module as shown in FIG. 1 illustrated without the rearward housing portion, and without the transmitter and receiver circuit boards.
Figure 11:
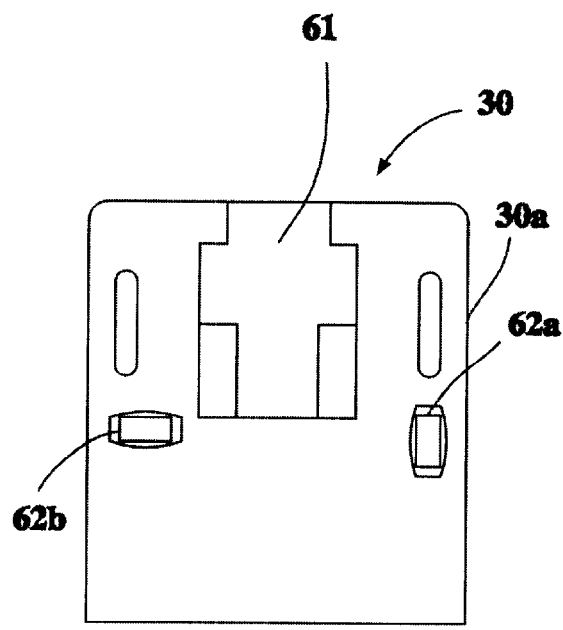
FIG. 11 is a bottom plan view of the forward housing portion of the optical transceiver module as shown in FIG. 1 illustrated without the rearward housing portion, and without the transmitter and receiver circuit boards.

As shown perhaps best in FIGS. 7, 8 and 10, the forward portion 30*a* of the housing 30 includes an integrally formed transverse bulkhead 50 for receiving the optical emitter 44 and the optical detector 45. The transverse bulkhead 50 also defines a forward cavity 51 for receiving an optical fiber connector 23 (FIGS. 1 and 2). More particularly, the bulkhead 50 illustratively has two side-by-side openings therein 52, 53 for permitting light communication between respective fibers and the optical emitter 44 and optical detector 45. The bulkhead 50 and surrounding housing portions also define respective tubular guide channels 54, 55 aligned with the openings and extending into the forward cavity 51. Respective enlarged guide channels 56, 57 are also defined to the rear of the bulkhead 50 for receiving the optical emitter 44 and optical detector 45.

The forward housing portion 30*a* may preferably be formed by a metal die casting process as will be readily appreciated by those skilled in the art. The forward portion 30*a* may also include the opening 61 on the lower portion to receive a mating portion of the optical connector 23 (FIGS. 1 and 2). The die-cast housing forward portion 30*a* may have a width on the order of only about 0.6", for example.

In addition, as shown in the illustrated embodiment, the forward housing portion 30*a* may include a pair of keyed projections 62*a*, 62*b* extending outwardly from the lower portion thereof. The projections 62*a*, 62*b* are received within mating openings 63*a*, 63*b* (FIG. 1) to facilitate mounting before the conductive leads 40, 41 are soldered to the mounting board 22 as will also be readily appreciated by those skilled in the art.

As perhaps best shown in FIG. 3, the forward housing portion 30*a* includes three pairs of upper and lower longitudinally extending slots 65*a*, 65*b*, 66*a*, 66*b*, 67*a*, 67*b*. A first pair of slots 65*a*, 65*b* receives the side edges of the first circuit board 36 of the transmitter portion 26. The second pair of slots 66*a*, 66*b* receives the EMI shield 35, and the third pair of slots 67*a*, 67*b* receives the circuit board of 37 of the receiver circuit portion 27. The slotted arrangement facilitates assembly and accurate positioning of the circuit boards 26, 27 and the EMI shield 35 in parallel vertical orientations. The transmitter and receiver circuit boards 26, 27 are relatively closely positioned, and operate at relatively high operating frequencies, e.g. of 150 MHZ or greater; however, the EMI shield 35 reduces the potential for coupling noise between the circuit boards.

The EMI shield 35 is preferably an electrically conductive material, such as a metal, and the housing 30 may also be conductive to shield adjacent modules 25. The housing 30 and EMI shield 35 may be tied to a circuit ground on the mounting board 22 by a designated conductive pin as will be readily appreciated by those skilled in the art.

One method aspect of the invention is for making an optical transceiver module 25 of a type comprising a housing 30, an optical transmitter portion 26 comprising a first substrate or circuit board 36 having a first major surface, and an optical receiver portion 27 comprising a second substrate or circuit board 37 having a first major surface. The method preferably comprises the steps of positioning the first and second substrates 36, 37 within the housing 30 so that the respective first and second major surfaces are opposing and in spaced apart relation from one another, and positioning an EMI shield 35 within the housing and extending between the first and second major surfaces of the first and second substrates.

Another method aspect of the invention is also for making an optical transceiver module 35 and preferably comprises the steps of forming a housing 30 to have a generally rectangular elongate outer portion and an integrally formed transverse bulkhead 50 having first and second openings 52, 53 therein and defining a forward cavity 51 for receiving an optical fiber connector 23 therein, and positioning an optical transmitter portion 26 within the housing 30 and comprising a first substrate 36 and an optical emitter 44 carried by an end of the first substrate in registration with the first opening 52 in the bulkhead. The method also preferably further includes the steps of positioning an optical receiver portion 27 within the housing 30 and comprising a second substrate 37 and an optical detector 45 carried by an end of the second substrate aligned in registration with the second opening 53 of the bulkhead, and positioning an EMI shield 35 within the housing and extending between the first and second substrates.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An optical transceiver module comprising:

a housing;

an optical transmitter portion positioned within said housing and comprising a first substrate having a first major surface;

an optical receiver portion positioned within said housing and comprising a second substrate having a first major surface, said first major surface of the second substrate and the first major surface of said first substrate facing each other in a spaced apart relation;

an electromagnetic interference (EMI) shield positioned within said housing and extending between the first and second major surfaces of said first and second substrates;

a first plurality of conductive leads extending outwardly from said first substrate;

a second plurality of conductive lends extending outwardly from said second substrate;

said first plurality of leads being substantially parallel to the first substrate; and said second plurality of leads being substantially parallel to the second substrate.

2. The optical transceiver module according to claim 1 further comprising respective first and second ground planes on the first and second substrates.

3. The optical transceiver module according to claim 1 wherein said first and second substrates comprise respective first and second circuit boards.

4. The optical transceiver module according to claim 3 wherein the first plurality of conductive leads are L-shaped conductive leads extending outwardly from said first circuit board, and wherein the second plurality of conductive leads are generally L-shaped conductive leads extending outwardly from said second circuit board, and said first and second circuit boards being parallel to the long portions of the L-shaped conductive leads of the first and second circuit boards.

5. The optical transceiver module according to claim 3 wherein said optical transmitter portion further comprises at least one active component mounted on the first major surface of said first circuit board, and wherein said optical receiver portion further comprises at least one active component mounted on the first major surface of said second circuit board.

6. The optical transceiver module according to claim 3 wherein said optical transmitter portion further comprises an optical emitter carried by an end of said first circuit board, and wherein said optical receiver portion further comprises an optical detector carried by an end of said second circuit board.

7. The optical transceiver module according to claim 6 wherein said housing comprises an integrally formed transverse bulkhead having respective openings therein receiving said optical emitter and said optical detector and defining a forward cavity for receiving an optical fiber connector therein.

8. The optical transceiver module according to claim 1 wherein said housing comprises a series of longitudinally extending slots on interior surface portions thereof, and wherein said first substrate, said second substrate and said EMI shield are received in respective pairs of said slots.

9. The optical transceiver module according to claim 1 wherein said EMI shield comprises an electrically conductive material.

10. The optical transceiver module according to claim 1 wherein said housing has a generally rectangular elongate shape.

11. The optical transceiver module according to claim 10 wherein said housing comprises a forward portion and a rearward portion.

12. The optical transceiver module according to claim 1 wherein said housing comprises an electrically conductive material.

13. The optical transceiver module according to claim 1 wherein said housing further comprises a plurality of keyed mounting projections extending outwardly from a predetermined surface thereof.

14. An optical transceiver module comprising:

a housing having a generally rectangular elongate shape and a series of longitudinally extending slots on interior surface portions thereof;

an optical transmitter portion positioned within respective slots in said housing and comprising a first generally elongate circuit board having a first major surface;

an optical receiver portion positioned within respective slots in said housing and comprising a second generally elongate circuit board having a first major surface, said first major surface of the second generally elongate circuit board and the first major surface of said first circuit board facing each other in a spaced apart relation; and an electromagnetic interference (EMD shield positioned within respective slots in said housing and extending between the first and second major surfaces of said first and second circuit boards.

15. The optical transceiver module according to claim 14 further comprising respective first and second ground planes on said first and second circuit boards.

16. The optical transceiver module according to claim 15 wherein said first and second ground planes are on respective second major faces of said first and second circuit boards.

17. The optical transceiver module according to claim 14 wherein said optical transmitter portion further comprises a first plurality of generally L-shaped conductive leads extending outwardly from said first circuit board, and wherein said optical receiver portion further comprises a second plurality of generally L-shaped conductive leads extending outwardly from said second circuit board, and said first and second circuit boards being parallel to the long portions of the L-shaped conductive leads of the first and second circuit boards.

18. The optical transceiver module according to claim 14 wherein said optical transmitter portion further comprises at least one active component mounted on the first major surface of said first circuit board, and wherein said optical receiver portion further comprise at least one active component mounted on the first major surface of said second circuit board.

19. The optical transceiver module according to claim 14 wherein said optical transmitter portion further comprise an optical emitter connected to an end of said first circuit board, and wherein said optical receiver portion further comprise an optical detector at an end of said second circuit board.

20. The optical transceiver module according to claim 19 wherein said housing comprise an integrally formed transverse bulkhead and respective openings therein receiving said optical emitter and said optical detector and defining a forward cavity for receiving an optical fiber connector therein.

21. The optical transceiver module according to claim 14 wherein said EMI shield comprise an electrically conductive material.

22. An optical transceiver module comprising:

a housing comprising a generally rectangular elongate outer portion and an integrally formed transverse bulkhead having first and second openings therein and defining a forward cavity for receiving an optical fiber connector therein;

an optical transmitter portion positioned within said housing and comprising a first substrate and an optical emitter carried by an end of said first substrate to be positioned in registration with the first opening in said bulkhead;

an optical receiver portion positioned within said housing and comprising a second substrate and an optical detector carried by an end of said second substrate to be positioned in registration with the second opening of said bulkhead; and the first and second substrates facing each other in a spaced apart relation;

an electromagnetic interference (EMI) shield positioned within said housing and extending between the first and second substrates;

a first plurality of conductive leads extending outwardly from said first substrate;

a second plurality of conductive lends extending outwardly from said second substrate;

said first plurality of leads being substantially parallel to the first substrate; and said second plurality of leads being substantially parallel to the second substrate.

23. The optical transceiver module according to claim 22 wherein said first substrate has a first major surface, and said second substrate has a second major surface, and wherein said first and second substrates are positioned so that the first and second major surfaces are in opposing spaced apart relation with said EMI shield positioned therebetween.

24. The optical transceiver module according to claim 23 wherein said first and second substrates comprise respective first and second circuit boards.

25. The optical transceiver module according to claim 24 further comprising respective first and second ground planes on said first and second circuit boards.

26. The optical transceiver according to claim 25 wherein said first and second ground planes are on respective second major surfaces of said first and second circuit boards.

27. The optical transceiver module according to claim 24 wherein the first plurality of conductive leads are generally L-shaped conductive leads extending outwardly from said first circuit board, and wherein the second plurality of conductive leads are generally L-shaped conductive leads extending outwardly from said second circuit board, and said first and second circuit boards being parallel to the long portions of the L-shaped conductive leads of the first and second circuit boards.

28. The optical transceiver module according to claim 24 wherein said optical transmitter portion further comprise at least one active component mounted on the first major surface of said first circuit board, and wherein said optical receiver portion further comprise at least one active component mounted on the first major surface of said second circuit board.

29. The optical transceiver module according to claim 22 wherein said housing comprise a series of longitudinally extending slots on interior surface portions thereof, and wherein said first substrate, said second substrate and said EMI shield are received in respective pairs of slots.

30. An apparatus for optical communication comprising:

a mounting circuit board; and a plurality of optical transceiver modules mounted on said mounting circuit board, each of said optical transceiver modules comprising a housing, an optical transmitter portion positioned within said housing and comprising a first substrate having a first major surface, an optical receiver position positioned within said housing and comprising a second substrate having a first major surface, said first major surface of the second substrate and the first major surface of said first substrate facing each other in a spaced apart relation, and an electromagnetic interference (EMI) shield positioned within said housing and extending between the first and second major surfaces of said first and second substrates;

a first plurality of conductive leads extending outwardly from said first substrate;

a second plurality of conductive lends extending outwardly from said second substrate;

said first plurality of leads being substantially parallel to the first substrate; and said second plurality of leads being substantially parallel to the second substrate.

31. The apparatus according to claim 30 further comprising respective first and second ground planes on said first and second substrates.

32. The apparatus according to claim 30 wherein said first and second substrates comprise respective first and second circuit boards.

33. The apparatus according to claim 32 wherein the first plurality of conductive leads are generally L-shaped conductive leads extending outwardly from said first circuit board, wherein the second plurality of conductive leads are generally L-shaped conductive leads extending outwardly from said second circuit board, and wherein said first and second pluralities of conductive leads are connected to said mounting circuit board, and said first and second substrates being parallel to the long portions of the L-shaped conductive leads of the first and second circuit boards.

34. The apparatus according to claim 32 wherein said optical transmitter portion further comprise at least one active component mounted on the first major surface of said first circuit boards, and wherein said optical receiver portion further comprise at least one active component mounted on the first major surface of said second circuit board.

35. The apparatus according to claim 32 wherein said optical transmitter portion further comprises an optical emitter carried by an end of said first circuit board, and wherein said optical received portion further comprises an optical detector carried by an end of said second circuit board.

36. The apparatus according to claim 35 wherein said housing comprises an integrally formed transverse bulkhead having respective openings receiving said optical emitter and said optical detector and defining a forward cavity for receiving an optical fiber connector therein.

37. The apparatus according to claim 30 wherein said housing further comprises a plurality of keyed mounting projections extending outwardly from a predetermined surface thereof and being received in corresponding openings in said mounting circuit board.

38. An optical transceiver module, comprising:

a box housing having a bottom wall, side walls, and a top wall, wherein the bottom wall is to be mounted to an external surface;

a first circuit board within the housing for mounting optical transmitter components, the first circuit board being mounted perpendicular to the bottom wall and parallel to the side walls;

a second circuit board within the housing for mounting optical receiver components, the second circuit board being mounted perpendicular to the bottom wall and parallel to the side walls and the first circuit board; and an electronic interface (EMI) shield positioned within the housing and between the first and second circuit boards.

39. An optical transceiver module, comprising:

a housing;

a first substrate having at least a portion positioned within the housing for mounting optical transmitter components;

a second substrate having at least a portion mounted positioned within the housing for mounting optical receiver components;

an electronic interface (EMI) shield having at least a portion positioned within the housing and positioned between the first and second substrates;

a first plurality of conductive leads extending outwardly from said first substrate;

a second plurality of conductive lends extending outwardly from said second substrate;

said first plurality of leads being substantially parallel to the first substrate; and said second plurality of leads being substantially parallel to the second substrate.

40. The optical transceiver module of claim 39, wherein the first substrate is substantially parallel to the second substrate.

41. The optical transceiver of claim 39, wherein the housing includes a top surface, and the first and second substrates are mounted substantially perpendicular to the top surface.

42. The optical transceiver of claim 39, wherein the housing includes a bottom surface, and the first and second substrates are mounted substantially perpendicular to the bottom surface.

43. The optical transceiver of claim 39, wherein the first and second substrates are printed circuit board.

* * * * *